US012128691B2

(12) United States Patent
Ando

(10) Patent No.: US 12,128,691 B2
(45) Date of Patent: Oct. 29, 2024

(54) RECORDING APPARATUS AND RECORDING METHOD

(71) Applicant: SEIKO EPSON CORPORATION, Tokyo (JP)

(72) Inventor: Keigo Ando, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 192 days.

(21) Appl. No.: 17/866,643

(22) Filed: Jul. 18, 2022

(65) Prior Publication Data

US 2023/0024356 A1 Jan. 26, 2023

(30) Foreign Application Priority Data

Jul. 19, 2021 (JP) ................................ 2021-118578

(51) Int. Cl.
*B41J 2/21* (2006.01)
*B41J 2/045* (2006.01)

(52) U.S. Cl.
CPC ......... *B41J 2/2117* (2013.01); *B41J 2/04551* (2013.01)

(58) Field of Classification Search
CPC .. B41J 2/04536; B41J 2/04586; B41J 2/2117; B41J 11/008; B41J 3/407
See application file for complete search history.

(56) References Cited

U.S. PATENT DOCUMENTS 8,632,146 B2 * 1/2014 Yoshida ............... H04N 1/6097 347/9
2006/0158481 A1 * 7/2006 Spevak .................. B41J 2/2114 347/43
2010/0143593 A1 6/2010 Sano
2011/0141174 A1 * 6/2011 Usuda .................... B41J 2/2114 347/12

FOREIGN PATENT DOCUMENTS

JP 2010-158884 A 7/2010

* cited by examiner

*Primary Examiner* — Thinh H Nguyen
(74) *Attorney, Agent, or Firm* — Harness, Dickey & Pierce, P.L.C.

(57) ABSTRACT

A recording apparatus includes a white ink jet head, a non-white ink jet head, and a control section that controls performing recording by performing a main scan a plurality of times in which, while a position of an ink jet head relative to the recording medium is moved, an ink composition is ejected from the ink jet head and is applied to the recording medium. The control section performs recording in a first recording mode in which the white ink composition and the non-white ink composition are applied to the same scan region of the recording medium by the same main scan and recording in a second recording mode in which the white ink composition and the non-white ink composition are applied to the same scan region of the recording medium by different main scans.

13 Claims, 3 Drawing Sheets

RECORDING APPARATUS AND RECORDING METHOD

The present application is based on, and claims priority from JP Application Serial Number 2021-118578, filed Jul. 19, 2021, the disclosure of which is hereby incorporated by reference herein in its entirety.

BACKGROUND

1. Technical Field

The present disclosure relates to a recording apparatus and a recording method.

2. Related Art

An ink jet recording method can be used to record a high-definition image with a relatively simple device and has developed rapidly in various fields. In the meantime, various investigations have been made to enhance image quality and the like. For example, JP-A-2010-158884 discloses a method for recording an image for the purpose of providing an image-recording method by which a high-quality image with reduced blurring is obtained. The method includes a first step of recording a base layer on a base material using an ink composition for forming base layers and a second step of recording a color image layer on the base layer using a process color ink composition in such a state that the percentage of a volatile component remaining in the base layer is 5 mass % to 50 mass %.

As described in JP-A-2010-158884, there is an advantage that a recorded material in which the visibility of a color image is good is obtained because the base layer is recorded and thereafter the color image layer is recorded. On the other hand, in such a method that the base layer and the color image layer are stacked, there is a problem in that recording speed is low because time is taken to stack the base layer and the color image layer and a large head is necessary. When no large head is necessary or recording speed is high, there is a problem in that no excellent image quality is obtained.

SUMMARY

The present disclosure is a recording apparatus that performs recording on a recording medium. The recording apparatus includes a white ink jet head that ejects a white ink composition containing a white colorant to apply the white ink composition to the recording medium, a non-white ink jet head that ejects a non-white ink composition containing a non-white colorant to apply the non-white ink composition to the recording medium, and a control section that controls performing recording by performing a main scan a plurality of times in which, while a position of an ink jet head relative to the recording medium is moved, an ink composition is ejected from the ink jet head and is applied to the recording medium. The control section performs recording in a first recording mode in which a layer containing the white ink composition and the non-white ink composition is formed by applying the white ink composition and the non-white ink composition to the same scan region of the recording medium by the same main scan and recording in a second recording mode in which a layer containing the white ink composition and a layer containing the non-white ink composition are formed so as to be stacked by applying the white ink composition and the non-white ink composition to the same scan region of the recording medium by different main scans.

The present disclosure is a recording method that includes using the above recording apparatus, selecting the first recording mode or the second recording mode, and performing recording in a selected recording mode.

DESCRIPTION OF EXEMPLARY EMBODIMENTS

Figure 1:
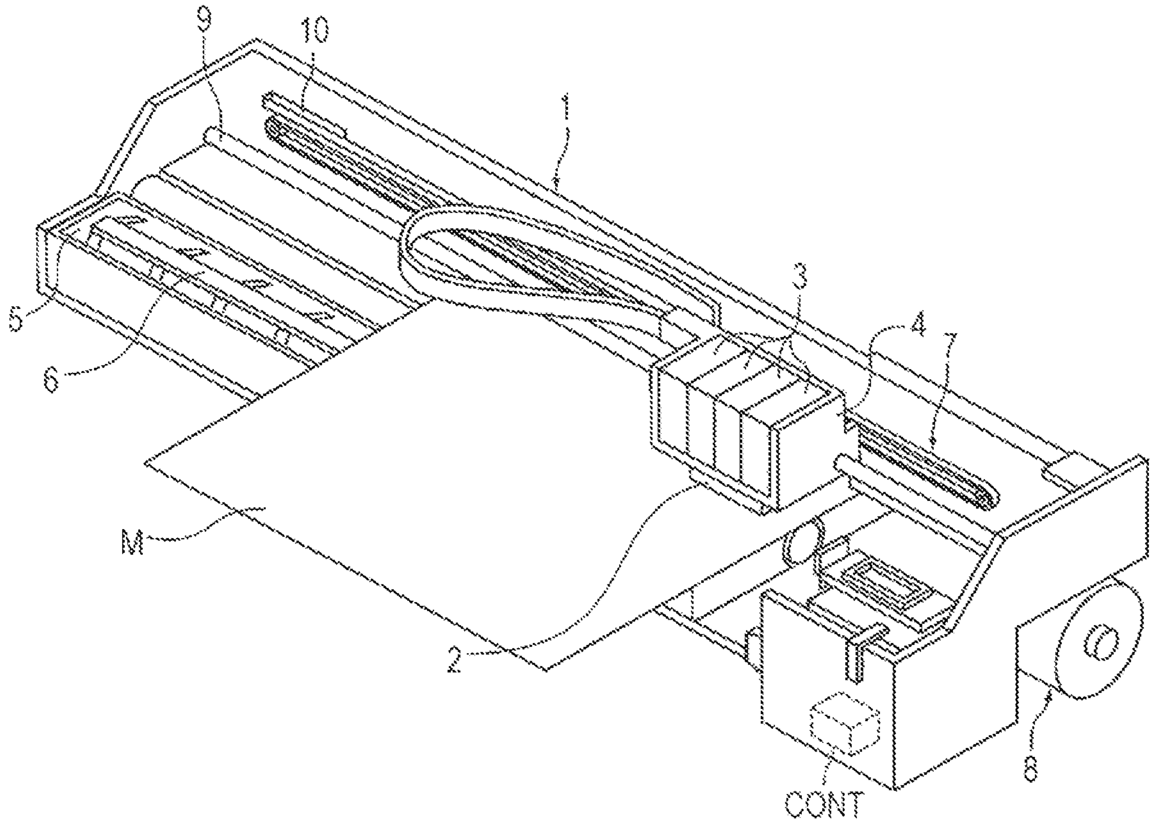
FIG. 1 is an illustration of an example of a recording apparatus used in this embodiment.

An embodiment (hereinafter referred to as "this embodiment") of the present disclosure is described below in detail with reference to drawings as required. The present disclosure is not limited to this embodiment. Various modifications can be made without departing from the spirit of the present disclosure. In the drawings, the same components are given the same reference numerals and will not be redundantly described. Vertical, horizontal, and other positional relations are based on those shown in the drawings unless otherwise specified. Dimensional ratios in the drawings are not limited to those shown in the drawings.

In this embodiment, a white ink jet head and a non-white ink jet head are simply referred to as an "ink jet head" when no distinction is made therebetween. Likewise, a white ink composition and a non-white ink composition are simply referred to as an "ink composition" when no distinction is made therebetween.

The term "main scan" refers to an operation in which an ink composition is ejected from an ink jet head and is applied to a recording medium in such a manner that the position of the ink jet head relative to the recording medium is moved. The ink jet head can be mounted on, for example, a carriage. The ink jet head may be moved by the movement of the carriage. This case corresponds to the movement of the ink jet head.

The term "main scan direction" refers to a direction in which the ink jet head is moved and also refers to a width direction of the recording medium. A "main scan" is the movement of the position of the ink jet head relative to the recording medium. The ink jet head may be moved relative to the recording medium. The recording medium may be moved relative to the ink jet head. A direction of movement of such a relative position is a main scan direction. The movement of the position of the ink jet head relative to the recording medium can be regarded as the movement of the position of the recording medium relative to the ink jet head. That is, the main scan is the movement of a relative position between the ink jet head and the recording medium.

On the other hand, the term "sub-scan" refers to an operation in which a relative position between the ink jet head and the recording medium is moved in a sub-scan direction. The term "sub-scan direction" refers to a direction that intersects the main scan direction. Recording can be performed by repeating, for example, an operation in which an ink composition is applied to a portion that adjoins or partly overlaps the ink composition applied in advance in such a manner that the ink composition is applied to a region of the recording medium in a main scan, the recording medium is slightly moved in a sub-scan, and the next main scan is performed. The “sub-scan” is also the movement of the position of the ink jet head relative to the recording medium. The ink jet head may be moved relative to the recording medium. The recording medium may be moved relative to the ink jet head. A direction of such relative movement is a sub-scan direction.

Recording may be performed in such a manner that each of the main scan and the sub-scan is performed a plurality of times. For example, the main scan and the sub-scan may be alternately performed.

1. Recording Apparatus

A recording apparatus of this embodiment that performs recording on a recording medium includes a white ink jet head that ejects a white ink composition containing a white colorant to apply the white ink composition to the recording medium, a non-white ink jet head that ejects a non-white ink composition containing a non-white colorant to apply the non-white ink composition to the recording medium, and a control section that controls performing recording by performing a main scan a plurality of times in which, while a position of an ink jet head relative to the recording medium is moved, an ink composition is ejected from the ink jet head and is applied to the recording medium. The control section performs a first recording mode in which a layer containing the white ink composition and the non-white ink composition is formed by applying the white ink composition and the non-white ink composition to the same scan region of the recording medium by the same main scan and a second recording mode in which a layer containing the white ink composition and a layer containing the non-white ink composition are formed so as to be stacked by applying the white ink composition and the non-white ink composition to the same scan region of the recording medium by different main scans.

Hitherto, a good-quality image has been recorded in such a manner that a white ink layer and a non-white ink layer are formed so as to overlap each other and the white ink layer is used as a hidden layer. However, there is a problem in that forming the white ink layer and the non-white ink layer such that the white ink layer and the non-white ink layer overlap each other proportionally reduces recording speed. The inventors have investigated this problem and have found that even if the white ink layer and the non-white ink layer are not formed so as to overlap each other as before, a recorded material obtained by forming a single ink layer containing a white ink composition and a non-white ink composition on a recording medium serves as an image with no density variation and excellent color development.

Therefore, in this embodiment, the first recording mode can be performed in such a manner that the white ink composition and the non-white ink composition are applied to the same scan region of the recording medium by the same main scan and the second recording mode can be performed in such a manner that the white ink composition and the non-white ink composition are applied to the same scan region of the recording medium by different main scans.

That is, the first recording mode can be performed in such a manner that an image is formed using a single ink layer containing the white ink composition and the non-white ink composition with emphasis on recording speed and the second recording mode can be performed in such a manner that an image is formed by forming a white ink layer and a non-white ink layer such that the white ink layer and the non-white ink layer overlap each other as before with emphasis on image quality. That is, recording in the first recording mode and recording in the second recording mode can be performed.

An example of a recording apparatus used in this embodiment is described below with reference to drawings. The recording apparatus used in this embodiment is not limited to a form below.

FIG. 1 shows an example of the recording apparatus used in this embodiment. In FIG. 1, an on-carriage type of printer in which an ink cartridge is mounted on a carriage is described as an example. The recording apparatus is not limited to the on-carriage type of printer and may be an off-carriage type of printer in which an ink cartridge is fixed to an outer portion. In the case of an off-carriage type, ink cartridges 3 may be fitted to a place other than a carriage 4 such that ink is supplied from the ink cartridges 3 to a recording head 2 with an ink supply tube interposed therebetween.

A printer used in description below is a serial printer that an ink jet head for recording is mounted on a carriage which moves in a predetermined direction and droplets are ejected on a recording medium by the movement of the ink jet head in association with the movement of the carriage. A serial type may be a type in which a main scan is performed in a direction that intersects a sub-scan direction that is a direction in which the recording medium is fed or a lateral type in which the ink jet head is alternately moved relative to the fixed recording medium in a main scan direction and the sub-scan direction.

As shown in FIG. 1, a printer 1 includes the recording head 2, the ink cartridges 3, the carriage 4, a platen 5, a heating mechanism 6, a carriage movement mechanism 7, a medium feed mechanism 8, a guide rod 9, a linear encoder 10, and a control section CONT.

1.1. Ink Jet Head

The recording head 2 is a unit that applies each ink composition to a recording medium M. The recording head 2 has a surface that faces the recording medium M, to which each ink composition is applied, and that has a first nozzle which ejects the white ink composition and a second nozzle which ejects the non-white ink composition. These nozzles are arranged in a row, whereby a nozzle surface is formed on a surface of a nozzle plate. In FIG. 1, the recording head 2 doubles as a white ink jet head and a non-white ink jet head.

A system that ejects the white ink composition or the non-white ink composition from the nozzles is, for example, a piezoelectric system in which a pressure and a recording information signal are applied to the white ink composition or the non-white ink composition together with a piezoelectric element such that droplets of the white ink composition or the non-white ink composition are ejected and are recorded. The recording head 2 used may be an ink jet head, a dot impact head, a thermal transfer head, or the like.

An ink jet head of this embodiment may have a head configuration in which a nozzle that ejects the white ink composition and a nozzle that ejects the non-white ink composition are horizontally arranged such that the white ink composition and the non-white ink composition are applied to the same scan region of the recording medium M by the same relative scan. Therefore, the whole ink jet head can be reduced in size as compared to a head configuration based on stacking hitherto performed.

Figure 2:
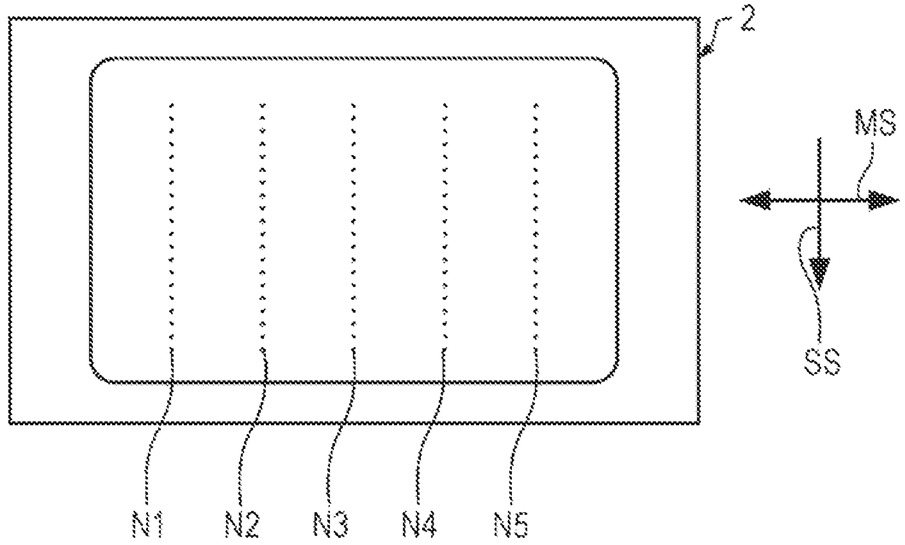
FIG. 2 is an illustration of an example of the configuration of an ink jet head.
Figure 3:
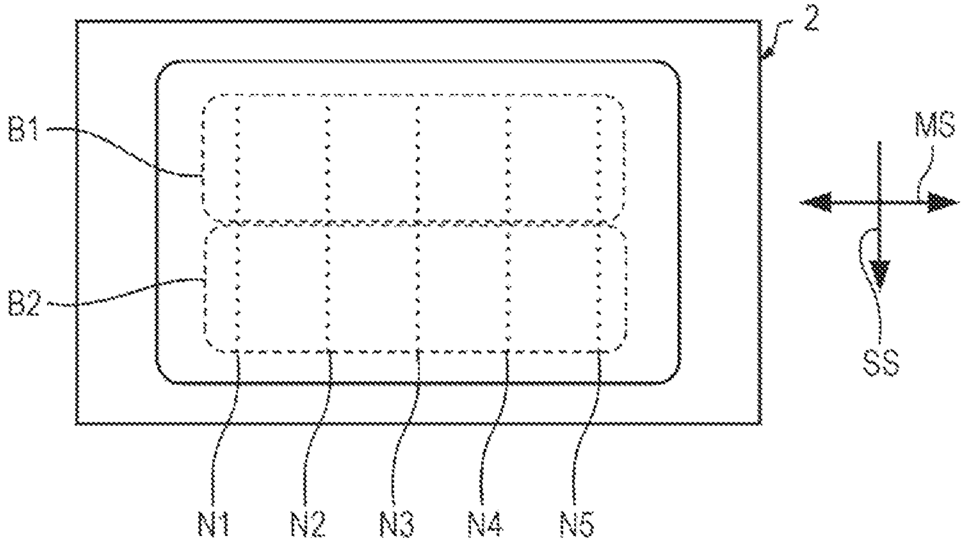
FIG. 3 is an illustration of an example of the configuration of an ink jet head.

FIGS. 2 and 3 show a nozzle-formed surface of the recording head 2. The recording apparatus of this embodiment can perform both the first recording mode and the second recording mode using the single recording head 2 because the control section CONT controls nozzles of the recording head 2.

The control of the nozzles of the recording head 2 in performing the first recording mode is described using FIG. 2. In an ink jet head shown in FIG. 2, an ink composition is ejected from the whole of each nozzle array in a sub-scan direction SS. When the white ink composition is ejected from a nozzle array N1 and the non-white ink composition is ejected from a nozzle array N2, the nozzle arrays N1 and N2 have portions that overlap each other in the sub-scan direction SS when the nozzle arrays N1 and N2 are projected in a main scan direction MS. In this case, the white ink composition and the non-white ink composition are applied to the same region of the recording medium M by the same main scan of the ink jet head.

In the case of the above example, the same region is a portion in which the nozzle arrays N1 and N2 overlap each other in the sub-scan direction SS when the nozzle array N1, which ejects the white ink composition, and the nozzle array N2, which ejects the non-white ink composition, are projected in the main scan direction MS.

The control of the nozzles of the recording head 2 in performing the second recording mode is described using FIG. 3. In an ink jet head shown in FIG. 3, a region is separated into blocks B1 and B2 in the sub-scan direction SS. In this ink jet head, the type of droplets can be changed for each block and each nozzle array. In FIG. 3, this ink jet head may be controlled such that, for example, the block B1 of a nozzle array N1 ejects the white ink composition and the block B2 of a nozzle array N2 ejects the non-white ink composition.

In this case, the white ink composition ejected from the block B1 of the nozzle array N1 is applied to the recording medium M by a main scan, the recording medium M is slightly moved in the sub-scan direction SS, and the non-white ink composition ejected from the block B2 of the nozzle array N2 is applied to the recording medium M by a next main scan so as to be deposited on the already applied white ink composition. This allows the white ink composition and the non-white ink composition to be applied to the same region of the recording medium M by different main scans of this ink jet head.

In the case of the above example, the same region is a portion in which the white ink composition and the non-white ink composition are applied so as to be layered by different main scans.

Another example of the second recording mode may be such that for example, in nozzle control in FIG. 2, the white ink composition is ejected from the nozzle array N1 and is applied to the recording medium M such that an ink layer of the white ink composition is formed, the recording medium M is next rewound, and the non-white ink composition is ejected from the nozzle array N2 and is applied to the ink layer of the white ink composition.

The control of the nozzles of the recording head 2 is not limited to the above. For example, in a form shown in FIG. 3, the first recording mode may be performed in such a manner that the block B1 of the nozzle array N1 is controlled so as to eject the white ink composition and the block B1 of the nozzle array N2 is controlled so as to eject the non-white ink composition such that the white ink composition and the non-white ink composition are applied to the same region of the recording medium M by the same main scan. For example, in a form shown in FIG. 2, the second recording mode may be performed in such a manner that the white ink composition is ejected from the nozzle array N1 by a main scan, the recording medium M is not moved in the sub-scan direction SS, and the non-white ink composition ejected from the nozzle array N2 is applied to the recording medium M by a next main scan such that the non-white ink composition is deposited on the already applied white ink composition.

Referring to FIG. 1, the ink cartridges 3, which supply the white ink composition and the like to the recording head 2, are independent four cartridges. For example, one of the four cartridges is filled with the white ink composition and each of the other cartridges is filled with a corresponding one of different types of non-white ink compositions. The ink cartridges 3 are detachably attached to the recording head 2. In an example shown in FIG. 1, the number of the cartridges is four. The number of the cartridges is not limited to four. A desired number of cartridges may be mounted.

The platen 5 is disposed under the recording head 2 and the recording medium M is transported to the platen 5. The printer 1 may further include the heating mechanism 6 that heats the recording medium M. The heating mechanism 6 is one of drying mechanisms.

The heating mechanism 6 may be disposed at a position at which the heating mechanism 6 can heat the recording medium M. A position at which the heating mechanism 6 is disposed is not particularly limited. In the example shown in FIG. 1, the heating mechanism 6 is disposed at a position which is located on or above the platen 5 and which faces the recording head 2. When the heating mechanism 6 is disposed at a position which faces the recording head 2, a position of the white ink composition or non-white ink composition applied to the recording medium M can be reliably heated and the white ink composition or non-white ink composition applied to the recording medium M can be efficiently dried.

Examples of the heating mechanism 6 include a print heater mechanism that brings the recording medium M into contact with a heat source to heat the recording medium M, a mechanism that emits an infrared ray or a microwave which is an electromagnetic wave with a maximum wavelength of about 2,450 MHz, a dryer mechanism that blows hot air, a platen heater, and the like.

The recording medium M is heated by the heating mechanism 6, before droplets ejected from the nozzles of the recording head 2 are applied to the recording medium M, when the droplets are applied to the recording medium M, or immediately after the droplets are applied to the recording medium M. For example, heating conditions such as the timing of heating, heating temperature, and heating time are controlled by the control section CONT.

1.2. Carriage

The carriage 4 carries a white ink jet head and a non-white ink jet head as the ink jet head 2 and can be detachably fitted with the ink cartridges 3. The ink cartridges 3 supply ink compositions to the recording head 2.

The carriage 4 is installed in such a state that the carriage 4 is supported with the guide rod 9 which is a support member extending in the main scan direction. The carriage 4 is moved by the carriage movement mechanism 7 along the guide rod 9 in the main scan direction. Moving the carriage 4 relative to the recording medium M and ejecting the ink compositions from the recording head 2 mounted on the carriage 4 enable the ink compositions to be applied to the recording medium M.

The relative movement of the carriage 4 is not particularly limited and one of the carriage 4 and the recording medium M may be moved relative to the other. Thus, in the example shown in FIG. 1, the carriage 4 is moved in the main scan direction. The movement of the carriage 4 is not limited to the main scan direction. A system (lateral scan system) in which a main scan and a sub-scan are performed on a fixed recording medium by head movement a plurality of times may be used.

The carriage movement mechanism 7 moves the carriage 4 in a medium width direction of the recording medium M. The medium feed mechanism 8 transports the recording medium M in a medium feed direction. Herein, the medium width direction is a main scan direction MS that is an operation direction of the recording head 2. The medium feed direction is a direction perpendicular to the main scan direction MS and is a sub-scan direction SS in which the recording medium M is moved.

1.3. Control Section

The control section CONT can control the operation of the whole printer 1. For example, the control section CONT can control performing recording in such a manner that the carriage 4 is moved relative to the recording medium M and a main scan in which ink compositions are ejected from the recording head 2 and are applied to the recording medium M is performed a plurality of times.

In particular, in this embodiment, the control section CONT performs the first recording mode, in which the white ink composition and the non-white ink composition are applied to the same scan region of the recording medium M by the same main scan, and the second recording mode, in which the white ink composition and the non-white ink composition are applied to the same scan region of the recording medium M by different main scans.

1.3.1. First Recording Mode

In the first recording mode, the white ink composition and the non-white ink composition are applied to the same scan region of the recording medium M by the same main scan, whereby a layer containing the white ink composition and the non-white ink composition is formed. This enables recording speed to be increased because layers of ink compositions need not be stacked. In addition, when the recording medium M is transparent, an image obtained in the first recording mode is such that an image viewed from front and an image viewed from back look identical to each other. Therefore, in the case of, for example, a recorded material which is used in such a manner that the recorded material is attached to a window or glass, an image that can be viewed from front and back can be obtained.

In the first recording mode, a main scan in which the white ink composition and the non-white ink composition are applied to a scan region may be performed on the same region a plurality of times. That is, it is preferable that after a layer containing the white ink composition and the non-white ink composition is applied to a region of the recording medium M by a main scan, another layer containing the white ink composition and the non-white ink composition is applied to that layer by another main scan. In this case, a main scan in which the white ink composition and the non-white ink composition are applied passes on the same region a plurality of times. As the number of scans is larger, ink can be applied to a desired region at a plurality of times (in a plurality of passes) and the image quality of a recorded material that is obtained tends to further increase.

Upon recording any region, the number of times an ink jet head passes on the region is referred to as a "pass". For example, when a main scan in which the white ink composition and the non-white ink composition are applied is performed on the same region four times, the pass number is referred to as four passes or the like. For example, in an example shown in FIG. 2, when the length of one sub-scan in the sub-scan direction is one-fourth the length of the nozzle array N1 in the sub-scan direction, a scan is performed on a rectangular scan region which has a length equal to the length of one sub-scan in the sub-scan direction and which extends in the main scan direction four times. The number of scans as viewed in this manner is referred to as a scan number, a pass number, or the like. The number of scans is one or more, is preferably two or more, more preferably three or more, further more preferably four or more, and particularly preferably eight or more. The upper limit of the number of scans is preferably, but is not limited to, 24 or less and is more preferably 12 or less.

The number of scans is set depending on the type of ink.

In the first recording mode, a layer containing the white ink composition is formed by a main scan different from a main scan in which a layer containing the white ink composition and the non-white ink composition is formed and the layer containing the white ink composition and the non-white ink composition and the layer containing the white ink composition may be stacked. Forming the layer containing the white ink composition as described above enables an image with higher color development to be obtained. The layer containing the white ink composition may be formed before or after the layer containing the white ink composition and the non-white ink composition is formed. When the layer containing the white ink composition is formed before the layer containing the white ink composition and the non-white ink composition is formed, a recorded material which is used in such a manner that an image is viewed from the recording surface side of a recording medium is obtained. When the layer containing the white ink composition is formed after the layer containing the white ink composition and the non-white ink composition is formed, a recorded material which is used in such a manner that an image is viewed from the side opposite to the recording surface side of a recording medium is obtained.

1.3.2. Second Recording Mode

In the second recording mode, the white ink composition and the non-white ink composition are applied to the same scan region of the recording medium M by different main scans, whereby a layer containing the white ink composition and a layer containing the non-white ink composition are formed so as to be stacked. This allows hiding properties to be ensured by the layer containing the white ink composition. Therefore, color development and visibility of the layer containing the non-white ink composition that is formed thereon increase and a high-quality image can be obtained.

In the second recording mode, the white ink composition and the non-white ink composition may be applied by different main scans and the order thereof is not limited. For example, when the white ink composition is applied in advance and the non-white ink composition is applied thereto, an image which can be viewed from an ink-applied surface side can be formed. In contrast, when a recording medium is transparent, when the non-white ink composition is applied in advance and the white ink composition is applied thereto, an image which can be viewed from an ink-unapplied surface side can be formed.

In the second recording mode, each of different main scans in which the white ink composition and the non-white ink composition are applied to the same scan region may be performed a plurality of times. It is conceivable that, for example, recording is performed using the white ink composition in four passes and thereafter recording is performed using the non-white ink composition in four passes.

1.3.3. Application Amount

The control section CONT preferably controls the ratio A1 of the first recording mode such that the ratio A1 of the first recording mode is less than the ratio A2 of the second recording mode when the ratio A of the application amount of the white ink composition to the application amount, 100 mass %, of the non-white ink composition is calculated in a region in which the application amount of the non-white ink composition is largest among regions of the recording medium M that are provided with the white ink composition and the non-white ink composition.

The ratio between application amounts is represented by the application amount of the white ink composition/the application amount of the non-white ink composition expressed in percent. When the application amounts of both are equal, the application amount of the white ink composition/the application amount of the non-white ink composition is 100 mass %.

Halation is more likely to occur on a recorded material in the first recording mode than in the second recording mode even if an equal amount of the white ink composition is used to form an ink layer mixed with a white ink. In this respect, controlling as described above enables an image with higher quality to be obtained in the first recording mode and the second recording mode. A unit region for determining application amount is a region having a predetermined area and may be, for example, a 2 mm square region.

The ratio A1 of the first recording mode due to the control of the control section CONT is preferably less than 80 mass %, more preferably 5 mass % to 75 mass %, further more preferably 10 mass % to 75 mass %, still further more preferably 30 mass % to 70 mass %, and yet still further more preferably 35 mass % to 65 mass %. When the ratio A1 is less than 80 mass %, color development tends to further increase and density variation tends to further decrease. When the ratio A1 is not less than the above range, visibility tends to further increase.

Furthermore, in the first recording mode, supposing that the application amount of the non-white ink composition in a region in which the application amount of the non-white ink composition is largest among regions provided with the white ink composition and the non-white ink composition is the maximum non-white ink application amount B1, the ratio between application amounts is preferably in the above range from a region in which the application amount of the non-white ink composition is the maximum non-white ink application amount B1 to a region in which the application amount of the non-white ink composition is 40 mass % of the maximum non-white ink application amount B1 among the regions provided with the white ink composition and the non-white ink composition.

Among the regions provided with the white ink composition and the non-white ink composition, a region in which the application amount of the non-white ink composition is less than 40 mass % of the maximum non-white ink application amount B1 is a region in which the color of an image of the non-white ink composition is relatively light and in which a difference in image quality is inconspicuous. In this region, the ratio between application amounts may be in the above range, greater than the above range, or less than the above range. When color development is given priority, the ratio between application amounts may be in the above range or less than the above range. When visibility is given priority, the ratio between application amounts may be in the above range or greater than the above range.

The ratio A2 of the second recording mode due to the control of the control section CONT is preferably 80 mass % or more, more preferably 85 mass % to 200 mass %, and further more preferably 90 mass % to 160 mass %. When the ratio A2 is 80 mass % or more, visibility tends to further increase. When the ratio A2 is 200 mass % or less, density variation tends to further decrease and adhesion tends to further increase.

In the second recording mode, supposing that the application amount of the non-white ink composition in a region in which the application amount of the non-white ink composition is largest among regions of the recording medium M that are provided with the white ink composition and the non-white ink composition is the maximum non-white ink application amount B2, the ratio between application amounts is preferably in the above range or greater than the above range, that is, the ratio between application amounts is preferably not less than the above range in a region in which the application amount of the non-white ink composition is less than the maximum non-white ink application amount B2 among the regions provided with the white ink composition and the non-white ink composition.

In the second recording mode, even when the ratio between application amounts is large, visibility and color development tend to be relatively excellent. Even if the ratio between application amounts is not less than the above range, excellent visibility and color development are obtained.

In the first recording mode, the maximum application amount of the white ink composition in a region in which the white ink composition and the non-white ink composition are applied so as to overlap each other is preferably 10 $mg/inch^2$ or less and more preferably 8 $mg/inch^2$ or less.

The lower limit of the maximum application amount of the white ink composition is preferably 0.50 $mg/inch^2$ or more, more preferably 1.0 $mg/inch^2$ or more, further more preferably 3.0 $mg/inch^2$ or more, and particularly preferably 5.0 $mg/inch^2$ or more.

The maximum application amount of the non-white ink composition is not particularly limited, may be an application amount appropriate to an image that should be recorded, and is preferably adjusted such that the ratio A1 is in the above preferable range. This enables an image that is obtained to be inhibited from becoming too white and tends to further enhance visibility and color development.

In the second recording mode, the maximum application amount of the white ink composition in a region in which the white ink composition and the non-white ink composition are applied so as to overlap each other is preferably 15 $mg/inch^2$ or less and more preferably in the preferable range in the first recording mode. The maximum application amount of the non-white ink composition may be in the preferable range in the first recording mode.

The linear encoder 10 detects the position of the carriage 4 in the main scan direction in the form of a signal. A signal detected by the linear encoder 10 is transmitted to the control section CONT in the form of positional information. The control section CONT recognizes the scanning position of the ink jet head 2 based on positional information from the linear encoder 10 and controls the recording operation of the recording head 2, that is, the ejection operation thereof or the like. The control section CONT is configured to be capable of variably controlling the movement speed of the carriage 4.

1.4. Ink Composition

The white ink composition and the non-white ink composition, which are used in this embodiment, contain the white colorant and the non-white colorant, respectively. Each of the white ink composition and the non-white ink composition may be an aqueous ink composition in which water is a main solvent or a solvent-based ink composition in which an organic solvent is a main solvent. Components of an ink composition are exemplified below using the aqueous ink composition as an example. Components that form an ink composition of this embodiment are not limited to those described below.

The white ink composition and the non-white ink composition, which are used in this embodiment, may be the solvent-based inks or the aqueous inks and each of them is preferably the aqueous ink. The aqueous inks have a relatively lower organic solvent content as compared to the solvent-based inks and therefore have high environmental responsiveness. However, the aqueous inks are such that a white ink and a non-white ink are likely to mix, the reduction of color development and density variation are likely to occur, and, in particular, an image that is obtained tends to be whitish. Therefore, the present disclosure is particularly useful. The term "aqueous" as used in an aqueous ink means that at least water is contained in the form of a main solvent component. The content of water contained in ink or the like is preferably 40 mass % or more, more preferably 50 mass % or more, and further more preferably 60 mass % to 98 mass %.

A nonaqueous ink is one that contains an organic solvent in the form of a main solvent component. The content of the organic solvent in the nonaqueous ink is preferably 40 mass % or more and more preferably 50 mass % to 98 mass %. The content of water in the nonaqueous ink is preferably 1 mass % or less and more preferably 0.5 mass % or less. Components other than a solvent component of the nonaqueous ink may be the same as components that may be contained in an aqueous ink described below.

In the case of the aqueous ink composition, the white ink composition and the non-white ink composition may contain water, an organic solvent, a surfactant, resin particles, and the like as required in addition to the above colorants. Components of the ink composition are described below in detail using the aqueous ink as an example.

1.4.1. White Colorant

The white colorant is not particularly limited. Examples of the white colorant include white inorganic pigments such as C. I. Pigment Whites 6, 18, and 21, silica, alumina, titanium dioxide, zinc oxide, antimony oxide, magnesium oxide, zirconium oxide, zinc sulfide, barium sulfate, and calcium carbonate. White organic pigments such as white hollow resin particles and polymer particles can be used in addition to the white inorganic pigments.

The white colorant used is preferably titanium dioxide among those exemplified above from a viewpoint that whiteness and the like are good. The white colorant may be used alone or in combination with one or more white colorants.

The content of the white colorant is preferably 1.0 mass % or more, more preferably 3.0 mass % or more, further more preferably 5.0 mass % or more, and particularly preferably 8.0 mass % or more with respect to the total amount of the white ink composition. The content of the white colorant is preferably 20 mass % or less, more preferably 15 mass % or less, further more preferably 12.5 mass % or less, and particularly preferably 10 mass % or less with respect to the total amount of the white ink composition. When the content of the white colorant is in the above range, an image with higher quality can be obtained in the first recording mode and the second recording mode.

In the second recording mode, the white ink composition is used for the purpose of hiding a background of an image in some cases. On the other hand, in the first recording mode, the white ink composition is used for the purpose of enhancing the visibility of an image obtained using the white ink composition in combination with the non-white ink composition rather than the purpose of hiding. Therefore, the content of the white colorant in the white ink composition may be low as compared to the case where the purpose is to hide a background. This allows an image with sufficient visibility to be obtained, allows the dispersion stability of the white colorant to be good, and allows the white colorant to be unlikely to precipitate. Furthermore, filling properties and the reduction of a difference in image quality are more excellent, which is preferable.

It is preferable that the white colorant can be stably dispersed in a dispersion medium. Therefore, the white colorant may be dispersed using a dispersant. The dispersant is a resin dispersant or the like and is selected from those that allow the dispersion stability of the white colorant in the white ink composition, which contains the white colorant, to be good. The white colorant may be used as a self-dispersing pigment in such a manner that, for example, a surface of pigment is oxidized with ozone, hypochlorous acid, fuming sulfuric acid, or the like or surfaces of pigment particles are modified by sulfonation.

1.4.2. Non-White Colorant

The non-white colorant may be a colorant other than the white colorant and is not particularly limited. Examples of the non-white colorant include inorganic pigments such as carbon blacks (C. I. Pigment Black 7) including furnace black, lamp black, acetylene black, and channel black and organic pigments such as quinacridone pigments, quinacridonequinone pigments, dioxazine pigments, phthalocyanine pigments, anthrapyrimidine pigments, anthanthrone pigments, indanthrone pigments, flavanthrone pigments, perylene pigments, diketopyrrolopyrrole pigments, perinone pigments, quinophthalone pigments, anthraquinone pigments, thioindigo pigments, benzimidazolone pigments, isoindolinone pigments, azomethine pigments, and azo pigments. The non-white colorant may be used alone or in combination with one or more non-white colorants.

The content of the non-white colorant is preferably 0.5 mass % to 10 mass %, more preferably 0.5 mass % to 7.5 mass %, further more preferably 0.5 mass % to 6.0 mass %, and still further more preferably 1.0 mass % to 5.0 mass % with respect to the total amount of the non-white ink composition. When the content of the non-white colorant is in the above range, color development and visibility further increase and an image with higher quality can be obtained in the first recording mode and the second recording mode.

It is preferable that the non-white colorant can be stably dispersed in a dispersion medium. Therefore, the non-white colorant may be dispersed using a dispersant. The dispersant is a resin dispersant or the like and is selected from those that allow the dispersion stability of the non-white colorant in the non-white ink composition, which contains the non-white colorant, to be good. The non-white colorant may be used as a self-dispersing pigment in such a manner that, for example, a surface of pigment is oxidized with ozone, hypochlorous acid, fuming sulfuric acid, or the like or surfaces of pigment particles are modified by sulfonation.

Examples of the non-white ink composition, which contain the non-white colorant, include, but are not limited to, a cyan ink, a yellow ink, a magenta ink, a black ink, and the like.

1.4.3. Water

The content of water is preferably 45 mass % to 98 mass %, more preferably 55 mass % to 90 mass %, further more preferably 60 mass % to 85 mass %, and still further more preferably 65 mass % to 80 mass % with respect to the total amount of an ink composition.

1.4.4. Organic Solvent

The organic solvent may be a water-soluble organic solvent and is not particularly limited. Examples of the organic solvent include polyols, such as glycerol, not lower than triols; glycols such as ethylene glycol, diethylene glycol, triethylene glycol, propylene glycol, dipropylene glycol, 1,3-propanediol, 1,2-butanediol, 1,3-butanediol, 1,2-pentanediol, 1,2-hexanediol, 1,4-butanediol, 1,5-pentanediol, and 1,6-hexanediol; glycol ethers such as ethylene glycol monomethyl ether, ethylene glycol monoethyl ether, diethylene glycol monomethyl ether, diethylene glycol monoethyl ether, propylene glycol monomethyl ether, propylene glycol monoethyl ether, dipropylene glycol monomethyl ether, dipropylene glycol monoethyl ether, triethylene glycol monomethyl ether, and triethylene glycol monobutyl ether; nitrogen-containing solvents such as 2-pyrrolidone, N-methyl-2-pyrrolidone, and N-ethyl-2-pyrrolidone; and alcohols such as methanol, ethanol, n-propanol, iso-propanol, n-butanol, 2-butanol, tert-butanol, iso-butanol, n-pentanol, 2-pentanol, 3-pentanol, and tert-pentanol. The organic solvent may be used alone or in combination with one or more organic solvents.

The glycols are compounds containing two hydroxy groups in a molecule. Examples of the glycols include alkanediols in which alkanes are substituted with two hydroxy groups, condensates in which hydroxy groups of two or more molecules of the alkanediols are intermolecularly condensed, and the like.

In the glycols, the number of carbon atoms in a molecule is preferably 2 to 10, more preferably 3 to 8 further more preferably 3 to 6, and particularly preferably 3 to 5.

Examples of the alkanediols include 1,2-alkanediols, end-capped alkanediols, and the like, which are preferable.

The nitrogen-containing solvents are amide solvents. The amide solvents may be noncyclic amides, cyclic amides, and the like.

The cyclic amides are lactams. Examples of the cyclic amides include those described above, pyrrolidones such as 1-propyl-2-pyrrolidone and 1-butyl-2-pyrrolidone, N-methyl-ε-caprolactam, N-cyclohexyl-2-pyrrolidone, β-propiolactam, and the like.

The following amides can be given as examples of the noncyclic amides: for example, alkoxyalkylamides such as 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-iso-propoxy-N,N-dimethylpropionamide, 3-iso-propoxy-N,N-diethylpropionamide, 3-iso-propoxy-N,N-methylethylpropionamide, 3-tert-butoxy-N,N-dimethylpropionamide, 3-tert-butoxy-N,N-diethylpropionamide, and 3-tert-butoxy-N,N-methylethylpropionamide; N,N-dimethylacetoacetamide; N,N-diethylacetoacetamide; N-methylacetoacetamide; N,N-dimethylisobutyramide; N,N-dimethylformamide; N,N-diethylformamide; N,N-dimethylacetamide; N,N-diethylacetamide; and N,N-dimethylpropionamide.

The polyols not lower than triols are compounds containing three or more hydroxy groups in a molecule and include, for example, glycerol.

The glycol ethers are compounds in which one or two hydroxy groups of alkanediols in which alkanes are substituted with two hydroxy groups or condensates in which hydroxy groups of two or more molecules of the alkanediols are intermolecularly condensed are etherified. Etherification is monoetherification or dietherification. Etherification is preferably alkyl etherification. The glycol ethers are compounds containing one or no hydroxy group in a molecule. Examples of the glycol ethers include those described above.

The alcohols are compounds in which alkanes are substituted with one hydroxy group and which contain one hydroxy group in a molecule. Examples of the alcohols include those described above.

Among organic solvents, glycol solvents such as propylene glycol, 1,3-propanediol, and 1,2-hexanediol; nitrogen-containing solvents such as 2-pyrrolidone; and glycerol are preferable. Using such organic solvents tends to further enhance the image quality and recording speed of a recorded material that is obtained.

The content of the organic solvent is preferably 1.0 mass % to 40 mass %, more preferably 3.0 mass % to 30 mass %, further more preferably 5.0 mass % to 15 mass %, and still further more preferably 7.5 mass % to 15 mass % with respect to the total amount of an ink composition.

The content of organic solvents which are the glycols may be in the above range.

The content of a nitrogen-containing solvent is preferably 40 mass % or less, more preferably 10 mass % or less, further more preferably 5 mass % or less, and particularly preferably 2 mass % or less with respect to the total amount of an ink composition. The lower limit of the content thereof is 0 mass % or more.

When the content of the organic solvent is in the above range, color development and recording speed of a recorded material that is obtained tends to further increase.

When the content of the nitrogen-containing solvent is not greater than the above range, image quality and adhesion are more excellent, which is preferable.

The normal boiling point of the organic solvent is preferably 150° C. to 280° C., more preferably 160° C. to 270° C., further more preferably 170° C. to 260° C., still further more preferably 180° C. to 200° C., and yet still further more preferably 190° C. to lower than 200° C.

When the normal boiling point of the organic solvent is in the above range, adhesion tends to further increase.

In particular, the content of an organic solvent with a normal boiling point of lower than 200° C. among organic solvents contained in the white ink composition or the non-white ink composition is preferably 50 mass % or more, more preferably 55 mass % or more, further more preferably 60 mass % or more, and particularly preferably 70 mass % or more with respect to the total amount of the organic solvents. The upper limit of the content of the organic solvent with a normal boiling point of lower than 200° C. is 100 mass % or less, is preferably 95 mass % or less, and may be 90 mass % or less. In particular, the content of the organic solvent with a normal boiling point of lower than 200° C. among the organic solvents contained in the white ink composition is preferably in the above range. When the content of the organic solvent with a normal boiling point of lower than 200° C. is in the above range, adhesion tends to further increase.

The white ink composition or the non-white ink composition preferably contains the organic solvent with a normal boiling point of lower than 200° C. and an organic solvent with a normal boiling point of 200° C. or higher.

The organic solvents with a normal boiling point in the above range are preferably glycols.

The maximum of the normal boiling points of the organic solvents contained in the white ink composition or the non-white ink composition is preferably 280° C. or lower, more preferably 250° C. or lower, further more preferably 240° C. or lower, and still further more preferably 230° C. or lower. The maximum of the normal boiling points of the organic solvents is preferably 150° C. or higher and more preferably 160° C. or higher. In particular, the maximum of the normal boiling points of the organic solvents contained in the white ink composition is preferably in the above range. When the maximum of the normal boiling points is in the above range, adhesion tends to further increase.

The weighted average of the normal boiling points of the organic solvents contained in the white ink composition or the non-white ink composition is preferably 290° C. or lower, more preferably 250° C. or lower, further more preferably 230° C. or lower, still further more preferably 220° C. or lower, yet still further more preferably 210° C. or lower, and particularly preferably 200° C. or lower. The weighted average of the normal boiling points of the organic solvents is preferably 150° C. or higher and more preferably 160° C. or higher. In particular, the weighted average of the normal boiling points of the organic solvents contained in the white ink composition is preferably in the above range. When the weighted average of the normal boiling points of the organic solvents is in the above range, adhesion tends to further increase.

In particular, it is preferable that each of the white ink composition and the non-white ink composition is the aqueous ink composition and does not contain more than 2 mass % of organic solvents that are glycols with a normal boiling point of higher than 280° C. or polyols not lower than triols. The phrase "not contain more than 2 mass %" means that the content of an alkylpolyol is 0 mass % or even if the alkylpolyol is contained, the content of the alkylpolyol does not exceed 2 mass %. Furthermore, it is preferable that the white ink composition and the non-white ink composition do not contain more than 1 mass % of the organic solvents. It is more preferable that the white ink composition and the non-white ink composition do not contain more than 0.5 mass % of the organic solvents.

The content of an organic solvent with a normal boiling point of higher than 280° C. may be in the above range.

1.4.5. Surfactant

The surfactant is not particularly limited. Examples of the surfactant include an acetylene glycol surfactant, a fluorinated surfactant, and a silicone surfactant. Among these, the silicone surfactant is preferable. This tends to further suppress density variation of a recorded material that is obtained.

The acetylene glycol surfactant is not particularly limited and is preferably one or more selected from the group consisting of, for example, 2,4,7,9-tetramethyl-5-decyne-4,7-diol, an alkylene oxide adduct of 2,4,7,9-tetramethyl-5-decyne-4,7-diol, 2,4-dimethyl-5-decyne-4-ol, and an alkylene oxide adduct of 2,4-dimethyl-5-decyne-4-ol.

The fluorinated surfactant is not particularly limited. Examples of the fluorinated surfactant include perfluoroalkylsulfonates, perfluoroalkylcarboxylates, perfluoroalkyl phosphonates, perfluoroalkyl-ethylene oxide adducts, perfluoroalkyl betaines, and perfluoroalkylamine oxide compounds.

Examples of the silicone surfactant include polysiloxane compounds and polyether-modified organosiloxanes.

The content of the surfactant is preferably 0.1 mass % to 4.0 mass %, more preferably 0.3 mass % to 3.0 mass %, and further more preferably 0.5 mass % to 2.0 mass % with respect to the total amount of an ink composition. This tends to further suppress density variation of a recorded material that is obtained.

1.4.6. Resin Particles

Using the resin particles further increases the adhesion of an image that is obtained. The resin particles are not particularly limited and are, for example, those made of a urethanic resin, an acrylic resin (including a styrene-acrylic resin), a fluorene-based resin, a polyolefinic resin, a rosin-modified resin, a terpenic resin, a polyester resin, a polyamide resin, an epoxy resin, a vinyl chloride resin, a vinyl chloride-vinyl acetate copolymer, an ethylene-vinyl acetate resin, or the like. The resin particles may be in the form of emulsion.

Among these, the urethanic resin, the acrylic resin, and the polyolefinic resin are preferable. The resin particles are often handled in the form of emulsion and may be in the form of powder. The resin particles may be used alone or in combination with other resin particles.

The term "urethanic resin" is a generic name for resins containing a urethane bond. The urethanic resin used may be a polyether-type urethane resin having a main chain containing an ether bond in addition to a urethane bond, a polyester-type urethane resin having a main chain containing an ester bond, a polycarbonate-type urethane resin having a main chain containing a carbonate bond, or the like.

The term "acrylic resin" is a generic name for polymers obtained by polymerizing at least one acrylic monomer such as (meth)acrylic acid or (meth)acrylate as one component. Examples of the acrylic resin include resin obtained from an acrylic monomer, a copolymer of the acrylic monomer and a monomer other than the acrylic monomer, an acrylic-vinyl resin that is a copolymer of the acrylic monomer and a vinylic monomer, and the like. Examples of the vinylic monomer include styrene and the like. The acrylic monomer used may be acrylamide, acrylonitrile, or the like.

Among these, the styrene-acrylic resin is preferable. The styrene-acrylic resin is not particularly limited. Examples of the styrene-acrylic resin include a styrene-acrylic acid copolymer, a styrene-methacrylic acid copolymer, a styrene-methacrylic acid-acrylate copolymer, a styrene-α-methylstyrene-acrylic acid copolymer, a styrene-α-methylstyrene-acrylic acid-acrylate copolymer, and the like. Using such resin tends to further enhance the image quality and abrasion resistance of a recorded material that is obtained.

The polyolefinic resin is one having a structural skeleton derived from an olefin such as ethylene, propylene, or butylene and may be a known one appropriately selected.

The content of the resin particles is preferably 0.5 mass % to 15 mass %, more preferably 1.0 mass % to 10 mass %, and further more preferably 2.5 mass % to 7.5 mass % with respect to the total amount of an ink composition. When the content of the resin particles is in the above range, the abrasion resistance of a recorded material that is obtained tends to increase.

1.4.7. Other Components

An ink composition may further contain components such as a preservative, a rust preventive, a chelating agent, a viscosity modifier, an oxidation inhibitor, and a fungicide.

1.5. Recording Medium

A recording medium used in this embodiment is not particularly limited. Examples of the recording medium include absorbent recording media such as paper, film, and cloth; low-absorbent recording media such as printing paper; and non-absorbent recording media such as metal, glass, and polymers.

Among these, a low-absorbent recording medium or a non-absorbent recording medium is preferable from a viewpoint of ink absorbency. A non-white recording medium is preferable from a viewpoint of color. For such recording media, hitherto, a good-quality image has been recorded in such a manner that a white ink layer and a non-white ink layer are formed so as to overlap each other and the white ink layer is used as a hidden layer. Therefore, using the present disclosure enables an effect of the present disclosure that an image with no density variation and excellent color development to be effectively exhibited.

In this embodiment, the term "non-absorbent or low-absorbent recording medium" refers to a "recording medium having a water absorption amount of 10 mL/$m^2$ or less in 30 $msec^{1/2}$ from the start of contact in the Bristow method". The Bristow method is the most popular method for measuring the amount of absorbed liquid in a short time and has been adopted by Japan Technical Association of the Pulp and Paper Industry (JAPAN TAPPI). Details of the Bristow method are described in Standard No. 51 "Paper and paperboard-liquid absorption test method-Bristow method" in "JAPAN TAPPI Pulp and Paper Test Methods, 2000".

Examples of the ink non-absorbent recording medium include substrates, such as paper, coated with plastic; substrates, such as paper, having plastic films bonded thereto; plastic films having no absorption layer (absorbing layer); and the like. The term "plastic", as used herein, includes polyvinyl chloride, polyethylene terephthalate, polycarbonate, polystyrene, polyurethane, polyethylene, polypropylene, and the like.

Examples of the low-absorbent recording medium include recording media provided with a low-absorbent coating layer on a surface. The recording media are called, for example, coated paper. For example, one in which a substrate is paper is printing paper such as art paper, coat paper, or matte paper. When a substrate is a plastic film, those in which the surface of polyvinyl chloride, polyethylene terephthalate, polycarbonate, polystyrene, polyurethane, polyethylene, polypropylene, or the like is coated with a polymer or the like and those in which the surface thereof is coated with particles of silica, titanium, or the like and a binder are cited.

The recording medium used may be an absorbent recording medium. The term "absorbent recording medium" refers to a "recording medium having a water absorption amount of more than 10 mL/$m^2$ in 30 $msec^{1/2}$ from the start of contact in the Bristow method".

Examples of the non-white recording medium include recording media which are transparent (transparent recording media). The transparent recording media may be colorless and transparent or may be colored (non-white) and transparent. The term "transparent" includes "translucent". These are recording media that have visible light transmission. These are visible light-transmitting recording media. In this case, an image formed on a single surface of the recording medium by a recording method of this embodiment is visible well from both sides.

Examples of the non-white recording medium include recording media which are non-white and colored (non-white colored recording media), non-white colored opaque recording media, non-white colored transparent recording media, and the like. In this case, an image which is good in quality such as visibility, filling, or the reduction of a difference in image quality can be readily formed by the recording method of this embodiment. The non-white colored recording media may be the above-mentioned transparent recording media or those that are not any transparent recording media. Those that are not any transparent recording media are recording media that have no visible light transmission. Those that are not any transparent recording media are recording media that transmit no visible light. Herein, a non-white color is a color other than white.

2. Recording Method

The recording method of this embodiment includes using the above recording apparatus, selecting the first recording mode or the second recording mode, and performing recording by a selected recording mode.

The first recording mode or the second recording mode may be selected by a user in advance such that the recording apparatus performs one of the first recording mode and the second recording mode depending on the selection. In this case, a recording mode may be selected by using an operation section of the recording apparatus or on a print setting screen of a computer that transmits image data to the recording apparatus and directs the recording apparatus to record the image data.

In another method, the control section of the recording apparatus may select and perform the first recording mode or the second recording mode depending on the recording medium or information on image data that is recorded. When the control section of the recording apparatus selects the first recording mode or the second recording mode, the control section of the recording apparatus may have data in which the recording medium or image data that is recorded is associated with a recording mode that is selected and may select and perform one of the first recording mode and the second recording mode based on such data.

In the first recording mode, the control section allows the white ink composition and the non-white ink composition to be ejected and to be applied to the same scan region in the same main scan. Thereafter, the recording medium is moved by a sub-scan and a next main scan is performed.

In the second recording mode, the control section allows one of the white ink composition and the non-white ink composition to be ejected and to be applied to a scan region in a main scan. Thereafter, the recording medium is moved by a sub-scan. In a next main scan, the other of the white ink composition and the non-white ink composition is ejected and is applied to the scan region provided with one of the white ink composition and the non-white ink composition in the former main scan.

Figure 4:
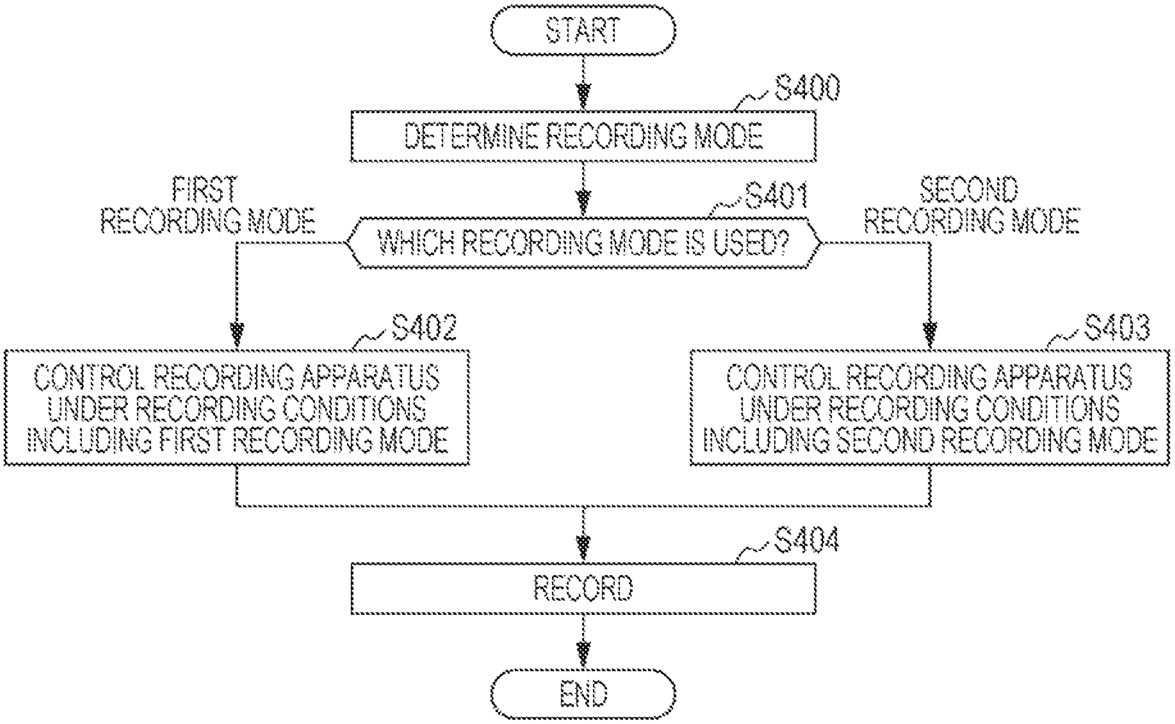
FIG. 4 is a flowchart showing an example of the control of a recording method of this embodiment.

FIG. 4 is a flowchart showing an example of the processing of controlling recording performed by the recording apparatus, which is used in this embodiment. The control section of the recording apparatus determines a recording mode in Step 400 when recording is started. The recording mode is a system of recording, a method of recording, a form of recording, or the like.

The recording mode is determined by, for example, an input signal input to the recording apparatus from an external device such as a computer or information input to a user input section included in the recording apparatus by a user. Herein, the input signal from the external device or the information input by the user may be information that directly designates the recording mode or information about recording such as the designation of recording speed or the designation of image quality. Information about recording is not limited to these. In the latter case, the recording apparatus stores corresponding information that determines a recording mode corresponding to information about recording in the control section or the like in the recording apparatus in advance and determines the recording mode with reference to the corresponding information.

In Step S401, the determined recording mode is identified. In Step S402 or S403, the recording apparatus is controlled depending on the determined recording mode under recording conditions associated with the recording mode. The recording conditions include, for example, the selection of a portion of a nozzle array used for recording, the selection being necessary to perform recording in the first recording mode or the second recording mode and the like. In addition, control relating to the operation of the recording apparatus may be included. Control conditions relating to recording include, for example, the maximum application amount of ink, conditions for primary drying, and the like.

In Step S404, recording is performed. The number of types of recording modes is two as shown in FIG. 4 and may be three or more. The recording apparatus may be controlled before the start of recording as shown in FIG. 4 and may be controlled during recording. That is, recording may be performed in such a state that the recording apparatus is controlled under the recording conditions.

Selecting the first recording mode or the second recording mode depending on required image quality or recording speed as described above enables an image with excellent image quality to be recorded and also enables recording at excellent recording speed.

Each recording mode may include a primary drying step.

The primary drying step is a step of drying the white ink composition or non-white ink composition applied to the recording medium using a drying mechanism at an early stage. In particular, in a step of applying the white ink composition and the non-white ink composition, a region provided with the white ink composition and the non-white ink composition is dried at an early stage.

The primary drying step is a step of drying ink applied to the recording medium at an early stage. The primary drying step is a step for drying at least a portion of a solvent component of the ink applied to the recording medium such that at least the fluidity of the ink is reduced. In the primary drying step, an ink composition may be applied to the heated recording medium, drying may be performed at the position of the recording medium that faces an ink jet head, or drying may be performed at an early stage after application. In the primary drying step, drying is preferably started in 0.5 seconds from the application of ink droplets to the recording medium.

The drying mechanism in the primary drying step is not particularly limited. Examples of the drying mechanism include a conduction system that performs heating with a platen heater, a preheater, or the like; a radiation system that performs heating with an IR heater or the like; and a blast system with a blast fan. A blast promotes evaporation by removing an evaporated solvent component from a medium to provide excellent image quality. The blast system is not limited to hot air and may use room-temperature air. Room-temperature air has no thermal influence on nozzles and is therefore preferable.

The drying mechanism is also referred to as a drying unit. The drying unit may be used alone or in combination with one or more drying units. In particular, the blast system and one of the conduction system and the radiation system are preferably used and the conduction system and the blast system are more preferably used. In this case, image quality is more excellent because heating can be performed with one of the conduction system and the radiation system and evaporation can be promoted with the blast system. In this case, the blast system may blow hot air or room-temperature air and room-temperature air is preferable in that ejection stability is more excellent.

The surface temperature of the recording medium in the primary drying step is preferably 25° C. or higher and is preferably 60° C. or lower. Furthermore, the surface temperature of the recording medium in the primary drying step is preferably 30° C. to 50° C., more preferably 35° C. to 45° C., and further more preferably 40° C. to 45° C. Alternatively, the surface temperature of the recording medium in the primary drying step is preferably 30° C. to 40° C. and more preferably 30° C. to 35° C.

The surface temperature of the recording medium in the primary drying step is the maximum temperature during recording.

When the surface temperature of the recording medium in the primary drying step is in the above range, image quality and the like tend to be more excellent.

Each recording mode may include a secondary drying step.

The secondary drying step is performed for the purpose of further drying a recorded material after the primary drying step. The secondary drying step means drying the recording medium provided with an ink compositions enough to enable the recorded material to be used and also means drying performed for completing recording. The secondary drying step may include heating for forming a component, such as resin, contained in the ink composition into a flat film. After all ink is applied to a region of the recording medium, heating is preferably started in more than 0.5 seconds from the completion of application.

The secondary drying step is also referred to as a post-drying step. In the secondary drying step, heating is preferably used. The surface temperature of the recording medium in the secondary drying step is preferably 50° C. to 120° C., more preferably 50° C. to 100° C., and further more preferably 60° C. to 90° C.

A drying method in the secondary drying step is not particularly limited. Examples of the drying method include a conduction system with a platen heater, a preheater, or the like; a radiation system with an IR heater or the like; a blast system with a blast fan; and the like.

Figure 5:
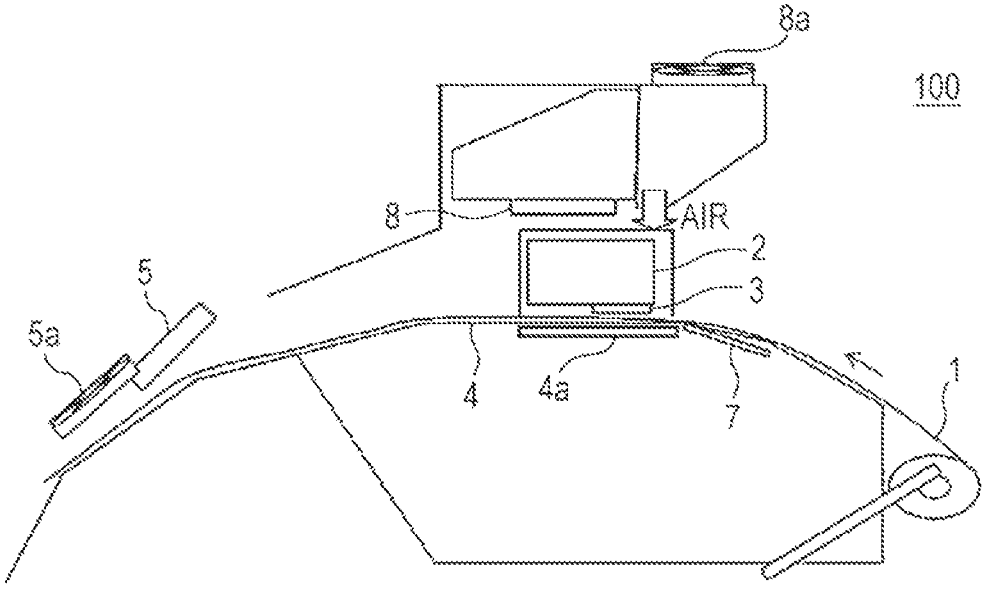
FIG. 5 is an illustration of an example of a recording apparatus used in this embodiment.

FIG. 5 is a schematic sectional view of the periphery of an ink jet head of the recording apparatus in FIG. 1 when viewed from side. FIG. 5 shows a drying mechanism and the like. The recording apparatus 100 includes a carriage 2, an ink jet head 3, a platen 4, a platen heater 4*a*, a preheater 7, an IR heater 8, a blast fan 8*a*, an after heater 5, and a cooling fan 5*a*. The recording apparatus 100 performs recording on a recording medium 1.

A conduction system with the platen heater 4*a* or the preheater 7, a radiation system with the IR heater 8, and a blast system with the blast fan 8*a* can be used as a drying mechanism used in the primary drying step. The primary drying step is performed using at least one of these systems.

In a blast with the blast fan 8*a*, air is blown to ink applied to the recording medium 1 located at a position that faces the ink jet head 3 in a recording medium transport direction, thereby enabling evaporation to be promoted. The after heater 5 is the drying mechanism used in the secondary drying step.

EXAMPLES

The present disclosure is further described below in detail using examples and comparative examples. The present disclosure is not in any way limited by the examples below.

1. Ink Compositions

Materials were mixed so as to give a composition shown in Table 1 below and were sufficiently stirred, whereby ink compositions were obtained. Specifically, the materials were uniformly mixed and insoluble matter was removed with a filter, whereby the ink compositions were prepared. In Table 1, values are in mass % and the total is 100.0 mass %. The amount of solid matter is shown unless otherwise specified. A colorant was mixed with a dispersant in advance, followed by stirring, whereby a pigment dispersion was prepared. The pigment dispersion was used to prepare ink. The dispersant used was a dispersible resin. For commercially available products suitable for pigments, pigment and the dispersant were mixed at a mass ratio of 2:1.

TABLE 1

| | | Non-white ink composition | | | | | White ink composition | | | | | |
|---|---|---|---|---|---|---|---|---|---|---|---|---|
| | | C1 | C2 | C3 | C4 | C5 | W1 | W2 | W3 | W4 | W5 | W6 |
| Colorant | P.B.15:3 | 5.0 | 5.0 | 5.0 | 5.0 | 5.0 | | | | | | |
| | Titanium dioxide | | | | | | 8.0 | 8.0 | 8.0 | 8.0 | 8.0 | 13.0 |
| Resin particles | Joncryl 537J | 5.0 | 5.0 | 5.0 | 5.0 | 5.0 | 5.0 | 5.0 | 5.0 | 5.0 | 5.0 | 5.0 |
| Organic solvent | Propylene glycol (184° C.) | 10.0 | 7.0 | 3.0 | 7.0 | 7.0 | 10.0 | 7.0 | 3.0 | 7.0 | 7.0 | 10.0 |
| | 1,3-Propanediol (209° C.) | | 3.0 | 7.0 | | | | 3.0 | 7.0 | | | |
| | 2-Pyrrolidone (245° C.) | | | | 3.0 | | | | | 3.0 | | |
| | Glycerol (290° C.) | | | | | 3.0 | | | | | 3.0 | |
| | 1,2-Hexanediol (228° C.) | 4.0 | 4.0 | 4.0 | 4.0 | 4.0 | 4.0 | 4.0 | 4.0 | 4.0 | 4.0 | 4.0 |
| Surfactant | Silface SAG503A | 1.0 | 1.0 | 1.0 | 1.0 | 1.0 | 1.0 | 1.0 | 1.0 | 1.0 | 1.0 | 1.0 |
| Water | | Balance | Balance | Balance | Balance | Balance | Balance | Balance | Balance | Balance | Balance | Balance |
| Total | | 100 | 100 | 100 | 100 | 100 | 100 | 100 | 100 | 100 | 100 | 100 |
| Weighted average of normal boiling points of organic solvents [° C.] | | 197 | 202 | 209 | 210 | 219 | 197 | 202 | 209 | 210 | 219 | 197 |
| Maximum of normal boiling points of organic solvents [° C.] | | 228 | 228 | 228 | 245 | 290 | 228 | 228 | 228 | 245 | 290 | 228 |

*Parenthesized values indicate normal boiling points of organic solvents.
Joncryl 537J (acrylic resin particles produced by BASF Japan Ltd.)
Silface SAG503A (silicone surfactant produced by Nissin Chemical Industry Co., Ltd.)

2. Recording Examples

A recording method used in each example is shown in Tables 2 and 3. Table 2 shows the types of white and non-white ink compositions used in Recording Examples A1 to A14 of a first recording mode and recording conditions such as pass number, application amount, and primary drying temperature. The primary drying temperature means the surface temperature of a recording medium which is heated with a platen heater and which is provided with ink.

For Recording Example A14, the pass number of white only is three. This shows that recording was first performed on a recording medium in three passes under conditions including an application amount of 3 mg/inch$^2$ using a white ink composition alone, the recording medium provided with a white ink layer is thereafter rewound, and white and color were recorded on the white ink layer at 6 mg/inch$^2$ and 3 mg/inch$^2$, respectively, in simultaneous six passes. Ink application amount is application amount in a 2 mm square region in a recorded pattern.

TABLE 2

| | | Recording example | | | | | | | | | | | | | |
|---|---|---|---|---|---|---|---|---|---|---|---|---|---|---|---|
| | | A1 | A2 | A3 | A4 | A5 | A6 | A7 | A8 | A9 | A10 | A11 | A12 | A13 | A14 |
| White ink | | W1 | W1 | W1 | W2 | W3 | W4 | W5 | W6 | W1 | W1 | W1 | W1 | W1 | W1 |
| Non-white ink | | C1 | C1 | C1 | C2 | C3 | C4 | C5 | C1 | C1 | C1 | C1 | C1 | C1 | C1 |
| Recording mode | | First | First | First | First | First | First | First | First | First | First | First | First | First | First |
| Pass | White and color together | 6 | 8 | 4 | 6 | 6 | 6 | 6 | 6 | 6 | 6 | 6 | 6 | 6 | 6 |
| number | Color only | 0 | 0 | 0 | 0 | 0 | 0 | 0 | 0 | 0 | 0 | 0 | 0 | 0 | 0 |
| | White only | 0 | 0 | 0 | 0 | 0 | 0 | 0 | 0 | 0 | 0 | 0 | 0 | 0 | 3 |
| Application amount of non-white ink (mg/inch$^2$) | | 6.00 | 6.00 | 6.00 | 6.00 | 6.00 | 6.00 | 6.00 | 6.00 | 6.00 | 6.00 | 6.00 | 6.00 | 6.00 | 6.00 |
| Application amount of white ink (mg/inch$^2$) | | 3.00 | 3.00 | 3.00 | 3.00 | 3.00 | 3.00 | 3.00 | 3.00 | 6.00 | 4.20 | 1.80 | 3.00 | 3.00 | 6.00 |
| Application amount of white ink (with respect to non-white ink) (%) | | 50% | 50% | 50% | 50% | 50% | 50% | 50% | 50% | 100% | 70% | 30% | 50% | 50% | 100% |
| Primary drying temperature (° C.) | | 45 | 45 | 45 | 45 | 45 | 45 | 45 | 45 | 45 | 45 | 45 | 50 | 40 | 45 |

Likewise, Table 3 shows conditions of Recording Examples B1 to B11 of a second recording mode and also shows the types of white and non-white ink compositions used and recording conditions such as pass number, application amount, and primary drying temperature. In the second recording mode, a white ink composition was first applied to a recording medium in a pass number and application amount in Table 3, the recording medium provided with a white ink layer is rewound, and a non-white ink composition was applied to the white ink layer in a pass number and application amount in Table 3.

Recording Example C1 in which recording was performed using a non-white ink composition only and Recording Example C2 in which recording was performed using a white ink composition only were prepared as reference examples.

3. Apparatus Example

A recording apparatus that was prepared was a modification of a serial ink jet printer (the trade name SC-S80650). The nozzle density per nozzle array was 600 npi, the number of nozzles was 600, and an ink jet head having nozzle arrays horizontally arranged in a main scan direction was used. Resolution during recording was set to 1,200×1,200 dpi.

The number of ink droplets per pixel and the amount of ink in each ink droplet were adjusted such that application amount reached a value in Table 2 or 3 at this resolution. The number of ink droplets per pass was also adjusted.

The recording apparatus was provided with such a platen heater and blast fan as shown in FIG. 4. The flow rate of the blast fan was set to 2 m/s in terms of flow rate near a surface of paper and the temperature of air near the paper surface

TABLE 3

| | | Recording example | | | | | | | | | | | | |
|---|---|---|---|---|---|---|---|---|---|---|---|---|---|---|
| | | B1 | B2 | B3 | B4 | B5 | B6 | B7 | B8 | B9 | B10 | B11 | C1 | C2 |
| White ink | | W1 | W1 | W1 | W2 | W3 | W4 | W5 | W6 | W1 | W1 | W1 | — | W1 |
| Non-white ink | | C1 | C1 | C1 | C2 | C3 | C4 | C5 | C1 | C1 | C1 | C1 | C1 | — |
| White application method | | Second | Second | Second | Second | Second | Second | Second | Second | Second | Second | Second | — | — |
| Pass | White and color together | 0 | 0 | 0 | 0 | 0 | 0 | 0 | 0 | 0 | 0 | 0 | 0 | 0 |
| number | Color only | 6 | 8 | 6 | 6 | 6 | 6 | 6 | 6 | 6 | 6 | 6 | 0 | 6 |
| | White only | 6 | 8 | 6 | 6 | 6 | 6 | 6 | 6 | 6 | 6 | 6 | 6 | 0 |
| Application amount of non-white ink (mg/inch$^2$) | | 6.00 | 6.00 | 6.00 | 6.00 | 6.00 | 6.00 | 6.00 | 6.00 | 6.00 | 6.00 | 6.00 | 6.00 | 0.00 |
| Application amount of white ink (mg/inch$^2$) | | 6.00 | 6.00 | 4.20 | 6.00 | 6.00 | 6.00 | 6.00 | 6.00 | 12.00 | 6.00 | 6.00 | 0.00 | 6.00 |
| Application amount of white ink (with respect to non-white ink) (%) | | 100% | 100% | 70% | 100% | 100% | 100% | 100% | 100% | 200% | 100% | 100% | 0% | — |
| Primary drying temperature (° C.) | | 45 | 45 | 45 | 45 | 45 | 45 | 45 | 45 | 45 | 50 | 40 | 45 | 45 |

was set to 25° C. Setting and measurement were performed in advance in such a state that there is no influence of the temperature of the platen heater, followed by performing recording under the preset conditions.

The heating power of the platen heater was adjusted such that the surface temperature of a recording medium reached a value in Table 2 or 3.

A solid image was recorded on a recording medium (PET 50A (transparent film), manufactured by LINTEC Corporation) in accordance with conditions described in each example in a predetermined application amount and pass number using ink compositions.

Thereafter, secondary drying was performed at 70° C. using a secondary drying mechanism. A recorded material was obtained in this manner.

A pass number described in Table 2 or 3 means, upon recording any region, the number of times the ink jet head passes over the region. For example, when the distance that the recording medium is moved by a sub-scan is one-sixth of the length of a nozzle array in a sub-scan direction, upon recording any region, the ink jet head passes over the region six times and an ink composition is ejected each time.

The recording apparatus was set such that a control section of the recording apparatus performed two recording modes as shown in Table 4. Each recording apparatus example selected recording examples in the two recording modes one by one and performed the recording examples in turn.

A recording apparatus example in Table 4 is an example. The control section of the recording apparatus may be set so as to perform any two of recording examples of each example in Tables 2 and 3.

4. Evaluation 4.1. Recording Speed

Recording speed was evaluated depending on a pass number required to perform recording on any portion of a recording medium in accordance with evaluation criteria below.

(Evaluation Criteria)

S: 4 passes or less
A: 5 passes to 7 passes
B: 8 passes to 10 passes
C: 11 passes to 13 passes
D: 14 passes or more 4.2. Visibility A recorded material obtained as described above was placed on black paper, the ease of viewing an image was visually observed, and visibility was evaluated in accordance with evaluation criteria below. Incidentally, when the application amount of a white ink is small, hiding properties of an image are insufficient, the blackness of black paper thereunder is seen through the image, and the image is unlikely to be visible.

(Evaluation Criteria)

A: An image is likely to be visible.
B: An image looks slightly blackish and is likely to be visible.
C: An image looks blackish and is unlikely to be visible.
D: An image looks blackish and is difficult to see.

4.3. Color Development

A solid image of a recorded material obtained as described above was measured for OD value under measurement conditions below using a colorimeter (i1Pro 2, manufactured by X-rite Inc.) and color development was evaluated in accordance with evaluation criteria below.

(Measurement Conditions)

D50 light source, status T, standard observer 2°, background: white paper (Evaluation Criteria)

S: An OD value of 1.2 or more
A: An OD value of 1.0 to less than 1.2
B: An OD value of 0.8 to less than 1.0
C: An OD value of 0.6 to less than 0.8
D: less than 0.6

4.4. Density Variation

A pattern image of a recorded material obtained as described above was visually checked and the density evenness (density variation) of a printed material was evaluated in accordance with evaluation criteria below.

(Evaluation Criteria)

S: A uniform image with no density variation is obtained.
A: A good image with no density variation is obtained.
B: An image with no density variation is obtained.
C: Nonuniform density variation can be visually confirmed.
D: There is nonuniform density variation, which is conspicuous.

4.5. Adhesion

For a recorded material obtained as described above, fabric was placed on a surface of a coating film and the coating film was rubbed to and fro with a load of 500 g using a Gakushin-type color fastness rubbing tester (manufactured by Tester Sangyo Co., Ltd.) 50 times. The surface exfoliation or scratch of the rubbed coating film was visually observed and adhesion was evaluated in accordance with evaluation criteria below.

(Evaluation Criteria)

S: No exfoliation or substantially no transfer to fabric is observed.
A: No exfoliation is observed and transfer to fabric is observed.
B: Exfoliation is observed and exfoliation ratio is 10 area % or less.
C: Exfoliation is observed and exfoliation ratio is more than 10 area % to 50 area % or less.
D: Exfoliation is observed and exfoliation ratio is more than 50 area %.

TABLE 4

| | Example 1 | | Example 2 | | Example 3 | | Example 4 | | Example 5 | | Example 6 | | Example 7 | | Example 8 | |
|---|---|---|---|---|---|---|---|---|---|---|---|---|---|---|---|---|
| Recording mode | First | Second | First | Second | First | Second | First | Second | First | Second | First | Second | First | Second | First | Second |
| Recording example | A1 | B1 | A2 | B2 | A3 | B3 | A4 | B4 | A5 | B5 | A6 | B6 | A7 | B7 | A8 | B8 |
| Recording speed | A | C | B | D | S | c | A | C | A | C | A | C | A | C | A | c |

TABLE 4-continued

| | | | | | | | | | | | | | | | | |
|---|---|---|---|---|---|---|---|---|---|---|---|---|---|---|---|---|
| Visibility | B | A | B | A | B | B | B | A | B | A | B | A | B | A | A | A |
| Coloring properties | B | A | B | S | C | A | B | A | B | A | B | A | B | A | C | A |
| Density variation | B | A | A | S | C | A | B | A | B | A | B | A | B | A | B | A |
| Adhesion | A | A | S | S | B | A | A | A | B | B | B | B | C | C | A | A |

| | Example 9 | | Example 10 | | Example 11 | | Example 12 | | Example 13 | | Comparative Example 1 | | Comparative Example 2 | | Reference Example 1 | |
|---|---|---|---|---|---|---|---|---|---|---|---|---|---|---|---|---|
| Recording mode | First | Second | First | Second | First | Second | First | Second | First | Second | First | Second | Second | Second | — | — |
| Recording example | A10 | B9 | A11 | B1 | A12 | B10 | A13 | B11 | A14 | B1 | A1 | A9 | B2 | B2 | C1 | C2 |
| Recording speed | A | C | A | C | A | C | A | C | B | C | A | A | D | D | A | A |
| Visibility | A | A | C | A | B | A | B | A | A | A | B | A | A | A | D | A |
| Coloring properties | C | A | A | A | B | A | C | A | B | A | B | C | S | S | A | D |
| Density variation | C | B | A | A | A | A | C | B | B | A | B | D | S | S | A | A |
| Adhesion | B | B | A | A | A | A | A | A | A | A | A | D | S | S | A | A |

5. Evaluation Results

In comparison between examples and comparative examples, all the examples, which were equipped with the first recording mode and the second recording mode, could perform recording with excellent recording speed and recording with excellent image quality.

On the other hand, the comparative examples could perform recording with excellent recording speed or recording with excellent image quality.

For example, Example 1 could perform recording with excellent recording speed by performing the first recording mode. In addition, Example 1 could perform recording with excellent visibility and color development by performing the second recording mode.

A reference example was equipped with a recording mode in which only one of a white ink and a non-white ink was used. It became clear that the reference example was poor in visibility or color development.

What is claimed is:

1. A recording apparatus that performs recording on a recording medium, comprising:

a white ink jet head that ejects a white ink composition containing a white colorant to apply the white ink composition to the recording medium;

a non-white ink jet head that ejects a non-white ink composition containing a non-white colorant to apply the non-white ink composition to the recording medium; and a control section that controls performing recording by performing a main scan a plurality of times in which, while a position of an ink jet head relative to the recording medium is moved, an ink composition is ejected from the ink jet head and is applied to the recording medium, wherein the control section performs recording in a first recording mode in which a layer containing the white ink composition and the non-white ink composition is formed by applying the white ink composition and the non-white ink composition to a same scan region of the recording medium by a same main scan, and recording in a second recording mode in which a layer containing the white ink composition and a layer containing the non-white ink composition are formed so as to be stacked by applying the white ink composition and the non-white ink composition to a same scan region of the recording medium by different main scans, and wherein when a ratio A of an application amount of the white ink composition to an application amount, 100 mass %, of the non-white ink composition is calculated in a region in which the application amount of the non-white ink composition is largest among regions of the recording medium that are provided with the white ink composition and the non-white ink composition, a ratio A1 of the first recording mode is less than a ratio A2 of the second recording mode.

2. The recording apparatus according to claim 1, wherein the white ink composition contains organic solvents and a content of an organic solvent with a normal boiling point of lower than 200° C. among the organic solvents is 50 mass % or more with respect to a total amount of the organic solvents.

3. The recording apparatus according to claim 1, wherein the white ink composition contains organic solvents and a maximum of normal boiling points of the organic solvents is 250° C. or lower.

4. The recording apparatus according to claim 1, wherein the white ink composition contains organic solvents and a weighted average of normal boiling points of the organic solvents is 200° ° C. or lower.

5. The recording apparatus according to claim 1, wherein in the first recording mode, the main scan in which the white ink composition and the non-white ink composition are applied to the scan region is performed on a same region a plurality of times.

6. The recording apparatus according to claim 1, wherein each of the white ink composition and the non-white ink composition is an aqueous ink composition or a solvent-based ink composition.

7. The recording apparatus according to claim 1, wherein the recording medium is a low-absorbent recording medium or a non-absorbent recording medium.

8. The recording apparatus according to claim 1, wherein the recording medium is a non-white recording medium.

9. The recording apparatus according to claim 1, wherein in the first recording mode, a layer containing the white ink composition is formed by a main scan different from a main scan in which a layer containing the white ink composition and the non-white ink composition is formed and the layer containing the white ink composition and the non-white ink composition and the layer containing the white ink composition are formed so as to be stacked.

10. A recording method comprising:

using the recording apparatus according to claim 1;

selecting the first recording mode or the second recording mode; and performing recording in a selected recording mode.

11. A recording apparatus that performs recording on a recording medium, comprising:

a white ink jet head that ejects a white ink composition containing a white colorant to apply the white ink composition to the recording medium;

a non-white ink jet head that ejects a non-white ink composition containing a non-white colorant to apply the non-white ink composition to the recording medium; and a control section that controls performing recording by performing a main scan a plurality of times in which, while a position of an ink jet head relative to the recording medium is moved, an ink composition is ejected from the ink jet head and is applied to the recording medium, wherein the control section performs recording in a first recording mode in which a layer containing the white ink composition and the non-white ink composition is formed by applying the white ink composition and the non-white ink composition to a same scan region of the recording medium by a same main scan, and recording in a second recording mode in which a layer containing the white ink composition and a layer containing the non-white ink composition are formed so as to be stacked by applying the white ink composition and the non-white ink composition to a same scan region of the recording medium by different main scans, and wherein when a ratio A of an application amount of the white ink composition to an application amount, 100 mass %, of the non-white ink composition is calculated in a region in which the application amount of the non-white ink composition is largest among regions of the recording medium that are provided with the white ink composition and the non-white ink composition, a ratio A1 of the first recording mode is less than 80 mass %.

12. A recording apparatus that performs recording on a recording medium, comprising:

a white ink jet head that ejects a white ink composition containing a white colorant to apply the white ink composition to the recording medium;

a non-white ink jet head that ejects a non-white ink composition containing a non-white colorant to apply the non-white ink composition to the recording medium; and a control section that controls performing recording by performing a main scan a plurality of times in which, while a position of an ink jet head relative to the recording medium is moved, an ink composition is ejected from the ink jet head and is applied to the recording medium, wherein the control section performs recording in a first recording mode in which a layer containing the white ink composition and the non-white ink composition is formed by applying the white ink composition and the non-white ink composition to a same scan region of the recording medium by a same main scan, and recording in a second recording mode in which a layer containing the white ink composition and a layer containing the non-white ink composition are formed so as to be stacked by applying the white ink composition and the non-white ink composition to a same scan region of the recording medium by different main scans, and wherein when a ratio A of an application amount of the white ink composition to an application amount, 100 mass %, of the non-white ink composition is calculated in a region in which the application amount of the non-white ink composition is largest among regions of the recording medium that are provided with the white ink composition and the non-white ink composition, a ratio A2 of the second recording mode is 80 mass % or more.

13. A recording apparatus that performs recording on a recording medium, comprising:

a white ink jet head that ejects a white ink composition containing a white colorant to apply the white ink composition to the recording medium;

a non-white ink jet head that ejects a non-white ink composition containing a non-white colorant to apply the non-white ink composition to the recording medium; and a control section that controls performing recording by performing a main scan a plurality of times in which, while a position of an ink jet head relative to the recording medium is moved, an ink composition is ejected from the ink jet head and is applied to the recording medium, wherein the control section performs recording in a first recording mode in which a layer containing the white ink composition and the non-white ink composition is formed by applying the white ink composition and the non-white ink composition to a same scan region of the recording medium by a same main scan, and recording in a second recording mode in which a layer containing the white ink composition and a layer containing the non-white ink composition are formed so as to be stacked by applying the white ink composition and the non-white ink composition to a same scan region of the recording medium by different main scans, and wherein a content of the white colorant is 8.0 mass % or more with respect to a total amount of the white ink composition.

* * * * *